United States Patent [19]

Tomlinson

[11] Patent Number: 5,067,329
[45] Date of Patent: Nov. 26, 1991

[54] CANNED BEVERAGE HOLDER

[75] Inventor: David L. Tomlinson, 1414 N. Minnesota, Shawnee, Okla. 74801

[73] Assignees: T Z & B Products; David L. Tomlinson, both of Shawnee, Okla. ; a part interest

[21] Appl. No.: 587,739

[22] Filed: Sep. 25, 1990

[51] Int. Cl.⁵ .............................................. F25D 3/08
[52] U.S. Cl. ..................................... 62/457.4; 62/530; 220/739
[58] Field of Search ................. 62/529, 530, 371, 372, 62/457.1, 457.4; 220/85 H

[56] References Cited

U.S. PATENT DOCUMENTS

| | | | |
|---|---|---|---|
| 3,302,427 | 2/1967 | Stoner et al. | 62/457 |
| 3,302,428 | 2/1967 | Stoner et al. | 62/457 |
| 4,163,374 | 8/1979 | Moore et al. | 62/457 |
| 4,183,226 | 1/1980 | Moore | 62/457 |
| 4,299,100 | 11/1981 | Crisman et al. | 62/457 |
| 4,629,153 | 12/1986 | Marcum | 248/558 |
| 4,638,645 | 1/1987 | Simila | 62/529 X |
| 4,720,023 | 1/1988 | Jeff | 220/412 |
| 4,741,176 | 5/1988 | Johnson et al. | 62/457 |
| 4,782,670 | 11/1988 | Long et al. | 62/457 |
| 4,928,848 | 5/1990 | Ballway | 220/444 |

Primary Examiner—Albert J. Makay
Assistant Examiner—John Sollecito
Attorney, Agent, or Firm—Laney, Dougherty, Hessin & Beavers

[57] ABSTRACT

A can holder assembly adapted for use with a commercially available thermal mug which includes a cap rim extending a ball structure for holding a beverage can so that the cap is tightly secured over the thermal mug while extending the can down within the mug and a coolant contained therein. A snap ring tightly received around the inner extremities of the cap rim then maintains a flexible sealing ring in tight, sealing grip around the beverage can.

3 Claims, 1 Drawing Sheet

U.S. Patent
Nov. 26, 1991
5,067,329
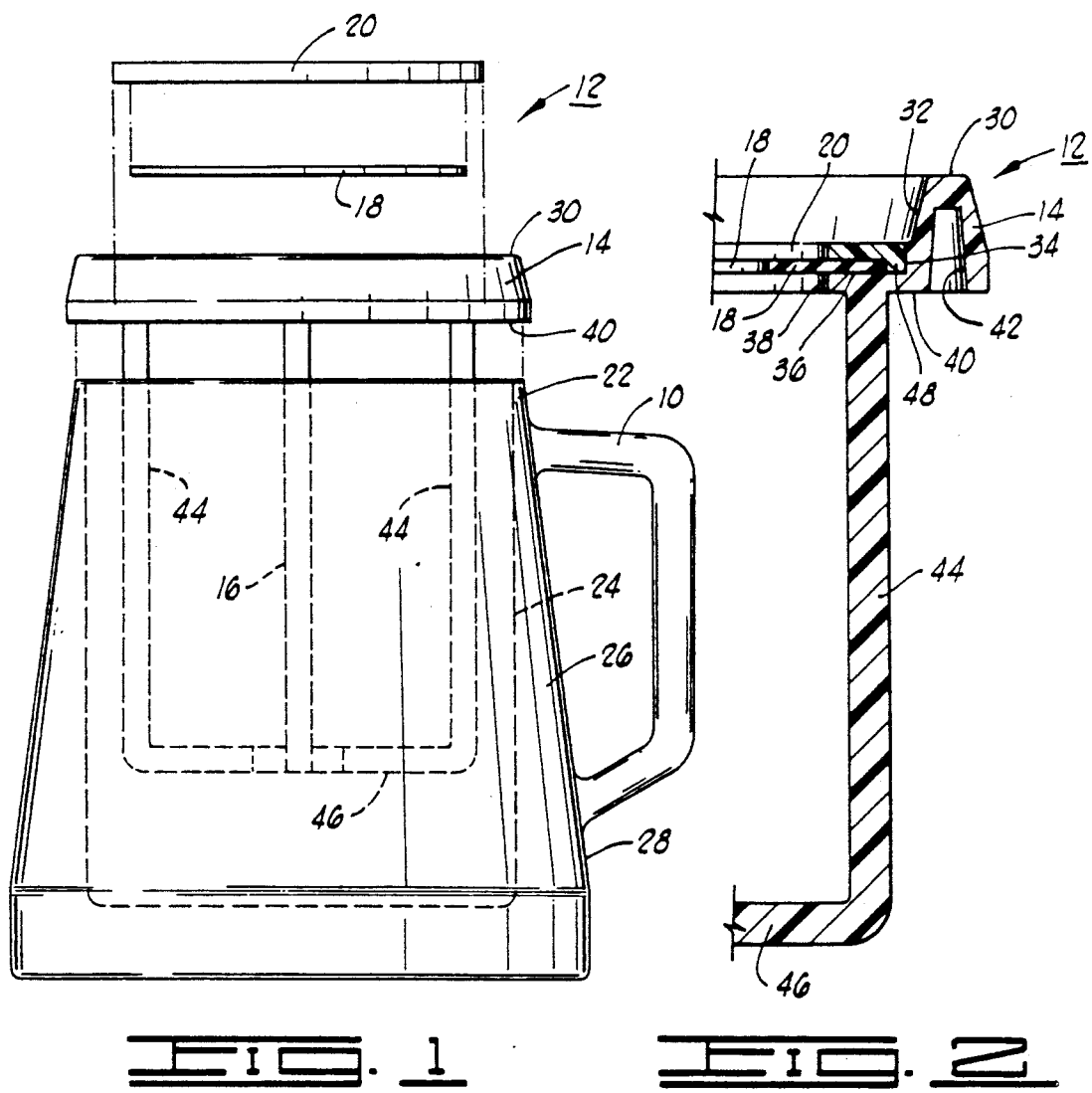
FIG. 1    FIG. 2
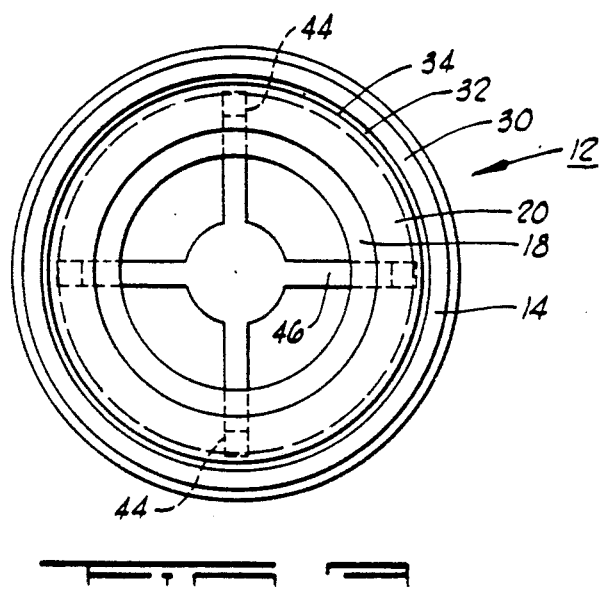

CANNED BEVERAGE HOLDER

BACKGROUND OF THE INVENTION

1. Field of the Invention

The invention relates generally to holders for canned beverages that maintain a coolant in contact with the can and, more particularly, but not by way of limitation, it relates to an improved can holder assembly that is adapted for use in combination with a thermally insulated cup of existing type.

2. Description of the Prior Art

There are numerous types of insulated cup or container holder that have been devised in the past. There is a current popularity for large quantity beverage cups having thermally insulated walls as dispensed through quick stop gas/deli stores and the like. This type of cup includes a sealing cap that provides thermal insulation while allowing drinking access as by a straw or other sipping arrangement. U.S. Pat. Nos. 3,302,427 and 3,302,428 teach an insulated cup wherein the inside radius is adapted to tightly receive a beverage can thereby to provide an insulated holder. The cup uses a coolant liquid as poured in through the bottom for circulation through the cup walls. U.S. Pat. Nos. 4,183,226 and 4,163,374 in the name of Moore et al. teach several forms of beverage container holder that utilize an insulated wall as they tightly receive the beverage container therein. U.S. Pat. No. 4,299,100 includes similarly based teachings to the aforementioned patents and U.S. Pat. No. 4,720,023 in the name of Jeff also teaches a very basic form of insulated mug holder for receiving a beverage can from which the drink is dispensed.

SUMMARY OF THE INVENTION

The present invention relates to an improvement consisting of a can holder attachment for use in combination with a standard or commercially available form of insulated beverage mug. The device consists of an upper rim having an inside opening and extending a plurality of bail struts in parallel with the axis. The bail struts terminate in a bail base of size and diameter for receiving a standard sized beverage can. The upper rim is formed to include an inside cylindrical wall within which a suitable snap ring fits to maintain a can-sized sealing gasket, and an annular slot is formed upward within the upper rim. One can then remove the seal top or other cap from the standard type of thermally insulated drinking mug and insert the invention downward therein to tightly engage the circular slot over the upper rim assembly thereby to suspend the bail structure down within the insulated cup. Proper coolant such as cracked ice or ice water can then be maintained in the cup surrounding the can as it is suspended in the bail structure and sealingly supported within the mug.

Therefore, it is an object of the present invention to provide an improved beverage can holder adapted to immerse the can in a suitable coolant as retained in a thermally insulated cup.

It is also an object of the invention to provide a beverage can holder that exercises active cooling in addition to simple insulation.

Finally, it is an object of the invention to provide a can holder that is adapted for use in combination with a commercially available thermal mug of widespread popularity.

Other objects and advantages of the invention will be evident from the following detailed description when read in conjunction with the accompanying drawings which illustrate the invention.

BRIEF DESCRIPTION OF THE DRAWINGS

FIG. 1 is a side view in elevation of a thermally insulated cup with can holder structure shown in exploded view;

FIG. 2 is a vertical section of a portion of the can holder cap structure; and

FIG. 3 is a top plan view of the can holder assembly.

DETAILED DESCRIPTION OF THE INVENTION

Referring to FIG. 1, a commercially available cup 10 is adapted to receive a can holder assembly 12 consisting of a cap rim 14 extending bail structure 16 and being coactive with a sealing ring 18 and snap ring 20. The thermally insulated mug 10 is a commercially available type of mug having an upper rim 22 and an inner lining 24 with the intralining space 26 between inner lining 24 and outer shell 28 filled with a suitable insulative foam plastic in well-known manner. Such thermally insulated mugs are commercially available from Alladin Mfg. Co. of Nashville, Tenn. The thermal mug 10 normally includes a cap and seal structure with drinking entry but this portion is removed for use of the can holder assembly 12.

In one form, the can holder assembly 12 is unitarily molded from a suitable plastic. Cap rim 14 consists of a top annular surface 30 and an inner wall 32 that extends into a cylindrical wall 34 adjoining an annular shoulder 36. Shoulder 36 leads inward to circular opening 38 which is slightly smaller than the standard-sized beverage can. The outer extremity of cap rim 14 includes an annular bottom surface 40 having a tapered circular slot 42 formed upwardly therein. The tapered slot 42 is of a size to tightly receive entry of the upper rim 22 of mug 10.

A plurality of bail struts 44, e.g., four struts in quadrature array, are formed to extend perpendicularly from the bottom surface 40 and the bail struts 44 lead downwardly in parallel relationship into formation of a bail base 46. The diameter of circular opening 38, and the length and spacing of bail struts 44 and diameter of bail base 46 are such as to receive a standard-sized beverage can securely therein.

A sealing ring 18 is formed of supple gasket material with the inside wall diameter distended when receiving the beverage can therethrough and having the outside wall diameter consonant with dimensions of the snap ring 20. Thus, snap ring 20 has an outside diameter for secure force-fit within the cylindrical wall 34 and it extends a peripheral tab 48 for secure positioning about the outer edge of sealing ring 18. The snap ring 20 may be glued in place with a suitable bonding agent. In this manner, snap ring 20 securely holds the sealing ring 18 coaxial with the central axis of cap rim 14 as the inner edge of sealing ring 18 firmly holds the inserted beverage can.

In operation, the standard thermal mug 10 is used by removing the standard sealing cap that is a normal part of the unit. The interior of mug 10 is then filled with chipped or crushed ice and/or ice water to act as coolant. A selected can of beverage may then be forced axially down through the sealing ring 18 within can holder assembly 12 until snug fit with the bottom of the can contacting bail base 46. In this attitude, the snap ring 20 is firmly received within circular wall 34 as tab rim 48 is seated against annular shoulder 36 to securely hold sealing ring 18 which, in turn, holds the beverage can. The can holder 12 with beverage can is then inserted into thermal mug 10 as bail struts 44 are passed downward within the opening of upper rim 22 and, depending on how full the user charged the mug interior with coolant ice water, the ice water will be displaced as the can holder assembly 12 is moved downward until the circular slot 42 is brought down over mug rim 22 firmly and in very tight engagement. When totally assembled, a small portion of the can will extend upward so that the user can drink either from the can opening or by straw sipping.

The foregoing discloses a novel can holder assembly for use with a commercially available type of thermal mug. The device brings about a cooler for a beverage can that induces active cooling by means of a coolant or ice mixture to give a cooling effect much greater than the more passive, simple insulative covering as provided by a thermal jacket or the like. The device is particularly advantageous when used with carbonated beverages as it eliminates an intermediate pouring step that greatly diminishes the carbonation prior to consumption. In effect, the present invention provides a neat and efficient cooling container for canned beverages.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:
1. A can holder in combination with a thermally insulated drinking mug having an entry lip and being adapted to contain a selected coolant, comprising:
   an annular cap having an inner wall, an upper rim and bottom surface with a circular slot extending upward through the bottom surface, said circular slot being adapted for tightly receiving said entry lip therein, having an annular shoulder formed inwardly adjacent the inner wall of the annular cap;
   a plurality of generally equally spaced bail struts connected to extend in parallel disposition from adjacent the inner wall of the annular cap into the drinking mug;
   a bail base member connected between the respective bail struts within the drinking mug;
   sealing means having an axial opening disposed within said annular cap to receive a can therethrough in sealed joinder for positioning as supported on said bail base in contact with the drinking mug coolant; and
   a snap ring firmly received within the annular cap inner wall to retain said sealing means in position.
2. A can holder as set forth in claim 1 wherein:
   said annular cap, bail struts and bail base are unitarily formed from suitable plastic material.
3. A can holder as set forth in claim 3 wherein said sealing means comprises:
   a sealing ring securely maintained on said annular shoulder by said retaining ring while having an inside diameter in distended contact around said can.

* * * * *

UNITED STATES PATENT AND TRADEMARK OFFICE
CERTIFICATE OF CORRECTION

PATENT NO. : 5,067,329
DATED : November 26, 1991
INVENTOR(S) : David L. Tomlinson It is certified that error appears in the above—identified patent and that said Letters Patent is hereby corrected as shown below:

On the Title page

In line 3 of the Abstract, delete the word "ball" and substitute the word --bail-- therefor; and in column 4, line 27 (line 1 of claim 3), delete the numeral "3" and substitute the numeral --1-- therefor.

Signed and Sealed this

Twenty-third Day of March, 1993

Attest:

STEPHEN G. KUNIN

*Attesting Officer*      Acting Commissioner of Patents and Trademarks